March 8, 1927. 1,620,534
C. R. GABRIEL
PRESS
Filed April 14, 1926 7 Sheets-Sheet 1

Fig.1.

INVENTOR:
Charles R. Gabriel,
By Attorneys,
Fraser, Myers & Manley

March 8, 1927.  C. R. GABRIEL  1,620,534
PRESS
Filed April 14, 1926   7 Sheets-Sheet 2

INVENTOR:
Charles R. Gabriel,
By Attorneys,
Fraser, Myers & Manley

March 8, 1927.  1,620,534
C. R. GABRIEL
PRESS
Filed April 14, 1926   7 Sheets-Sheet 4

INVENTOR:
Charles R. Gabriel
By Attorneys,
Fraser, Myers & Manley

March 8, 1927. 1,620,534
C. R. GABRIEL
PRESS
Filed April 14, 1926 7 Sheets-Sheet 5

INVENTOR:
Charles R. Gabriel,
By Attorneys,
Fraser, Myers & Manley

March 8, 1927.

C. R. GABRIEL 1,620,534

PRESS

Filed April 14, 1926    7 Sheets-Sheet 6

INVENTOR
Charles R. Gabriel,
By Attorneys,
Fraser, Myers & Manley

March 8, 1927.  1,620,534
C. R. GABRIEL
PRESS
Filed April 14, 1926   7 Sheets-Sheet 7

INVENTOR :
Charles R. Gabriel,
By Attorneys,
Fraser, Myers & Manley

Patented Mar. 8, 1927.

1,620,534

UNITED STATES PATENT OFFICE.

CHARLES R. GABRIEL, OF BROOKLYN, NEW YORK, ASSIGNOR TO E. W. BLISS COMPANY, OF BROOKLYN, NEW YORK, A CORPORATION OF DELAWARE.

PRESS.

Application filed April 14, 1926. Serial No. 102,008.

This invention relates to power presses in the general nature of punching presses, but applicable for a wide range of uses. The particular function for which the press is especially designed is that of extrusion. In this function, toward the end of the long free stroke and at the instant when the die members begin to exert pressure against the metal blank, a very heavy resistance is encountered, so that except at slow speed, the press is subjected to a serious shock. The heavy pressure required for extrusion occurs during only a small fraction of the total stroke; this heavy pressure may be adequately sustained by a press of the hydraulic type, but subject to the disadvantage of very slow operation. With a purely mechanical press where the reciprocating head is driven by a crank, eccentric, or other such means, the effect of the sharp blow struck as the dies encounter the resistance of the blank is highly detrimental to the press and to the dies, unless the press is driven at a moderately slow speed. The aim of the present invention is to overcome these disadvantages and enable a press for this and analogous purposes to be driven at higher speed and secure a correspondingly greater output.

According to the present invention the reciprocating head carrying the punch or other die member is driven by means affording a variable stroke such that in its descent it moves freely until toward the end of its stroke, when it is slowed down and preferably stopped just before or as it encounters the resistance afforded by the engagement with the blank (or other work to be done), whereupon the short remainder of the stroke, which is its active or effective portion, is performed under reduced speed and correspondingly increased power ratio or mechanical effect or leverage. On the return stroke or up-stroke of the head the same retardation toward the end of the stroke may advantageously occur to afford added time for accomplishing the stripping of the finished work from the punch or die member.

The improved construction concentrates the power of the press during the short fraction of its stroke employed to do its effective work and sustain its maximum resistance; during the remaining or free portion of the stroke the press can be operated at high speed; it results that without disadvantage to the press or dies, or detriment to the work, the press may be speeded up to a much higher speed than has heretofore been possible.

The invention also includes other features peculiar to extrusion or analogous presses, as will be described.

Referring to the accompanying drawings,—

Referring to the drawings, which are to be taken as illustrative of one suitable embodiment of the invention, A designates the general frame of the press, comprising a base B, uprights or side frames C C, and a crown or head D; E is the reciprocating head carrying the movable die member F, while the fixed die member G rests on the bed B. In an extrusion press the die member G is the female die, and the movable member F is the male die, commonly called a punch. These parts are shown at the end of the stroke in Fig. 7, and at the beginning of the effective portion of the stroke in Fig. 10.

The sliding head E may be driven by various mechanical means, the particular mechanism shown being well adapted to accomplish the purpose of my invention, and being the best means known to me to that end. According to this construction the head E is connected by a pitman or connecting rod H to a crank or eccentric I (an eccentric being shown) fast on a shaft J, on one end of which turns loosely the driving pulley K, and on its other end is fixed a gear L. Between the driving pulley and the shaft is a hub or sleeve M carrying a pinion N. The pulley K is shown as keyed to the sleeve M by a key $a$. The pinion N drives a gear O fast on a back-shaft P in rear of the crank-shaft J (see Fig. 5), and the shaft P on its opposite end has a pinion Q which drives the gear L during the greater part of the stroke. The gear L is a mutilated gear having two (or it may be one) blank portions $b$, one of which in the position shown in Fig. 3 faces the pinion Q, so that the gear is out of mesh with the teeth of pinion Q. The back-shaft P also carries adjacent the pinion Q a head or disk R which carries two driving pins or rollers S S which engage a large cam tooth T (of which two are shown), which is fixedly connected to the crank-shaft J, as by being formed on a crosshead $c$ bolted to a flange $d$ projecting from the gear L.

Figures 3, 11, 12:
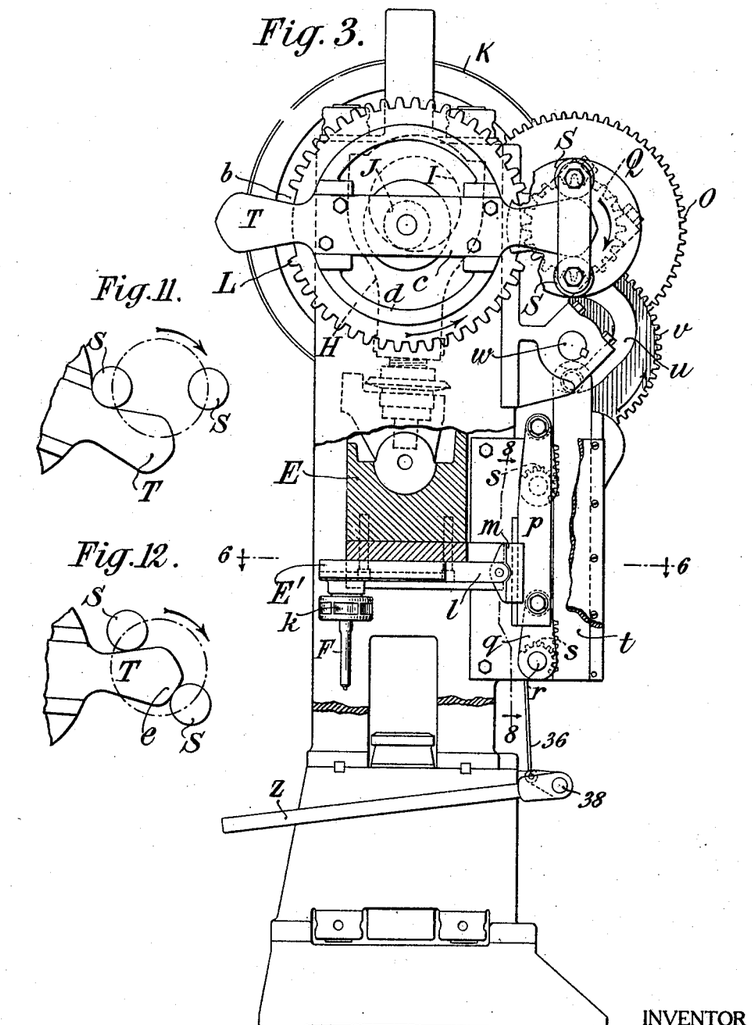
Fig. 3 is an elevation from the right hand of the press, its middle portion being partly broken away in nearly vertical mid-section.
Figs. 11 and 12 are diagrams showing two different positions of the cam movement.
Figure 4:
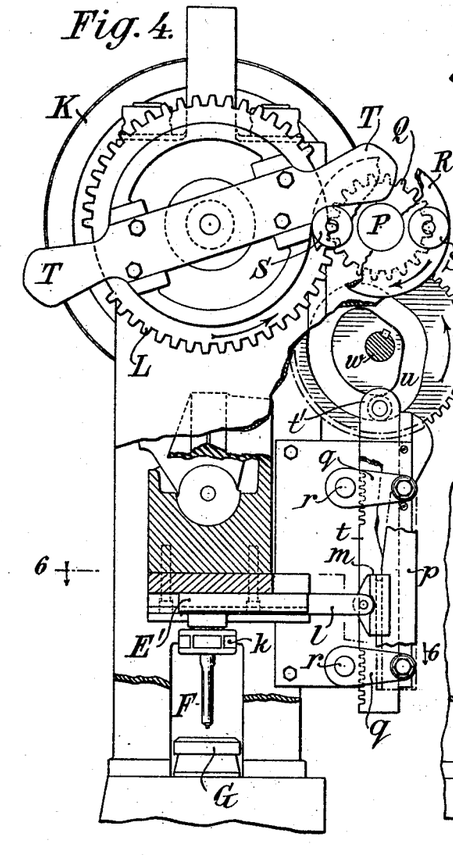
Fig. 4 is an elevation similar to Fig. 3, but showing the parts in a different position, the view being partly in vertical mid-section.

While the gear L is being driven by the pinion Q (as shown in Fig. 4), the crank-shaft J is driven at uniform speed through the greater part of the down-stroke or up-stroke of the head E; when, however, the last tooth of the wheel L, preceding its blank space $b$, is about to free itself from the teeth of the pinion Q, one of the rollers S is engaged by the cam tooth T (as shown in Fig. 11), and as the gear teeth free themselves the other roller S engages an outer face $e$ of the cam tooth T (as shown in Fig. 12), so that the tooth T is held between and driven by the two rollers until the parts reach the position shown in Fig. 3. During this movement (from the position of Fig. 11 to that of Fig. 3) the cam T (and consequently the shaft J) is driven at diminishing speed and brought to a stop. The movement thus imparted through the crank or eccentric to the slide E and to the punch may be traced in Fig. 13, where the line $x$ from 0° down to the point $f$ follows the usual curve due to the crank motion, and from $f$ to $g$ represents the retardation and stopping of the shaft H by the action of the rollers on the cam T, as thus described. The continued rotation of the rollers S S from the position shown in Fig. 3 to that shown in Fig. 4 restarts the movement of the cam T and gradually accelerates it until it is brought to the full normal speed, whereupon the teeth of pinion Q and gear L come into mesh and the shaft J is again driven at normal speed. This restarting and accelerating movement is indicated by the portion of the line $x$ in Fig. 13 from $g$ to $h$, the latter point being substantially coincident with the lower dead center of the crank movement. From this point the drive takes place through the mesh of the pinion Q with the gear L, and consequently at uniform speed during the up-stroke of the slide and punch. If a dwell near the end of the up-stroke similar to that occurring on the down-stroke is desired, the tooth L will, as shown, be duplicated on the diametrically opposite side of the gear L with likewise a duplication of the blank space $b$. In such event the operation just described will be repeated toward the end of the upstroke.

In the particular construction illustrated, the ratio of the gears Q and L when in mesh is as 2½ to 1 (the pinion Q having 20 teeth, and the gear L being proportioned for 50 teeth, but having four teeth removed for the blank on each side); the effect of the cam action between S T S is to lose the angular equivalent of two and one-half teeth in moving from the position of Fig. 11 to Fig. 3, and an equal amount when moving from the position of Fig. 3 to Fig. 4; it results that the shaft P in the precise construction shown makes three revolutions to each revolution of the shaft J. These proportions, however, may be greatly varied.

The gearing thus described, when used for modifying a crank motion, has an especially advantageous coaction in a press for extrusion or for other analogous uses, as will be described.

Figures 7, 9, 10:
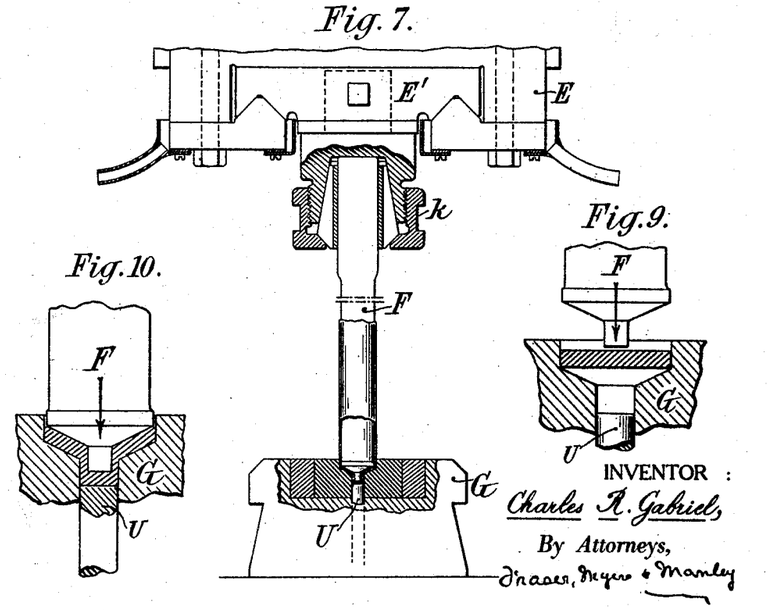
Fig. 7 is a fragmentary vertical section, also on a larger scale, being partly in elevation, viewed from the front.
Figs. 9 and 10 are enlarged vertical sections of the dies in two different positions.
Figure 13:
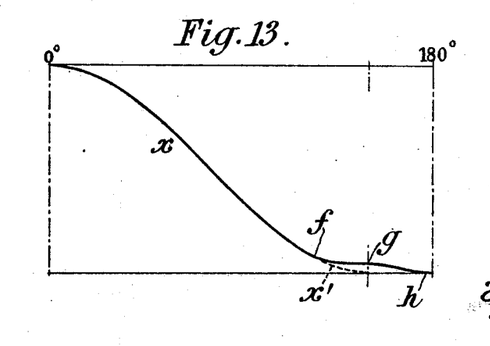
Fig. 13 is a diagram charting the downstroke of the punch.

In an extrusion press, in making such articles as metallic capsules, deep cups, or the like, the metal to be extruded is first formed into disk-shaped flat punchings or slugs, and at each stroke one of these is fed into the female die, so that it lies therein as shown in Fig. 9; the male die or punch then comes down and engages the slug, forcing it fully down into the die, and in the case of an article shaped as indicated, crimping it into the shape shown in Fig. 10. Thus far the metal of the slug has been merely indented or distorted, and has not yet begun to flow up into the annular space between the dies, and no serious resistance to the movement of the punch has developed; but from this point on the further descent of the punch encounters a serious resistance which continues during the active portion of the stroke, being that during which the metal is forced to flow up as a tube or skirt in the annular space between the dies, and thence up around the punch, until the completion of the stroke. It appears that in this extruding operation the maximum resistance of the metal being extruded occurs at the instant when the extruding flow begins, and it is advantageous that at this instant the punch shall advance at slow speed and under the maximum leverage. To accomplish this it is desirable that the punch shall actually come to rest just before this maximum resistance is encountered, and then shall gradually accelerate its movement while still moving slowly and under great mechanical advantage until the end of the extruding stroke is reached, as shown in Fig. 7. These conditions are admirably fulfilled through the coaction of the gearing above described, and the crank or eccentric movement, whereby the punch is given the dwell shown at $g$ in Fig. 13, just as it reaches the position shown in Fig. 10, and just before it encounters the maximum resistance as the extrusion flow begins. The extrusion consequently is performed in the portion of the stroke between $g$ and $h$ in Fig. 13, where the speed is much reduced and the mechanical advantage correspondingly increased. In Fig. 13 the dotted line $x'$ shows how the stroke of the punch would be timed, due alone to the eccentric movement, and without the interaction of the cam elements S T S; a comparison of the full and dotted lines shows the prolonged time and increases mechanical advantage during the effective portion of the stroke afforded by the present invention. With the eccentric movement alone the punch would still be moving at considerable velocity upon reaching the position shown in Fig. 10, and would strike a serious blow on encountering the resistance due to the initiation of flow of the extruding metal; to avoid this it is in such presses necessary to reduce the speed so that the punch may move slowly at this instant, but even then it is impossible to avoid some shock which is injurious to the dies. By bringing the punch to rest just before the effective extrusion begins, all such shock is avoided and the press may be driven at a far higher speed than has heretofore been possible.

During the up-stroke, the movement occurs in the ordinary manner as from an eccentric drive, which is suitable as no particular resistance is encountered. It is, however, advantageous to repeat the same dwell toward the end of the up-stroke, as thereby more time is afforded for stripping the extruded article from the punch. This is particularly desirable in view of the fact that the speeding up of the press permitted by this invention causes the punch to rise rapidly, and if no dwell were provided at its up-stroke very little time would be afforded for stripping.

Figure 1:
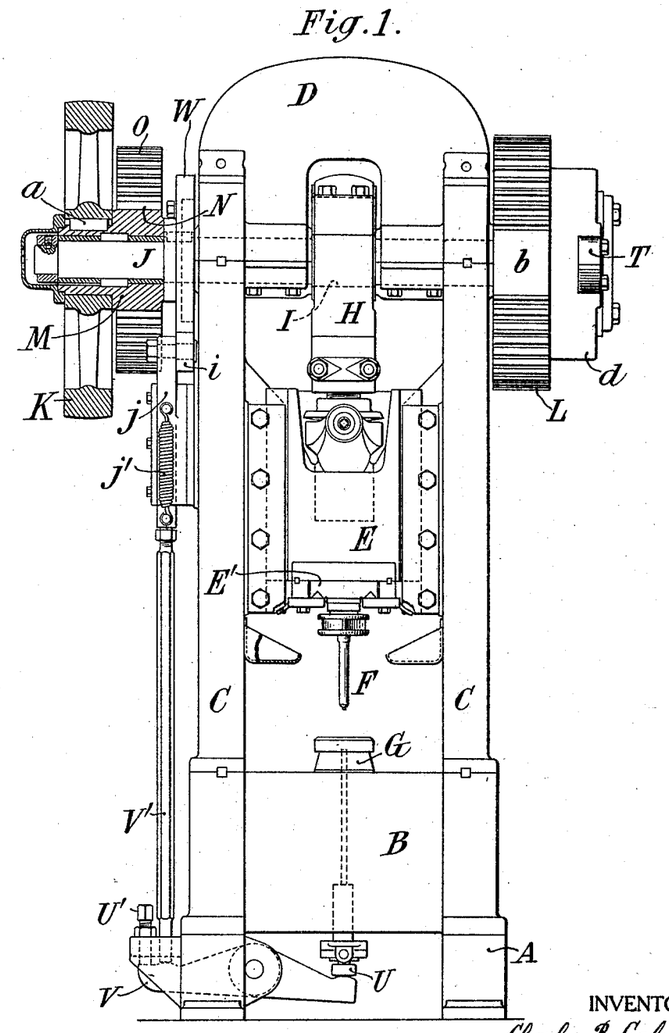
Figure 1 is a front elevation of the press, being partly in vertical mid-section at the upper left.
Figures 2, 8:
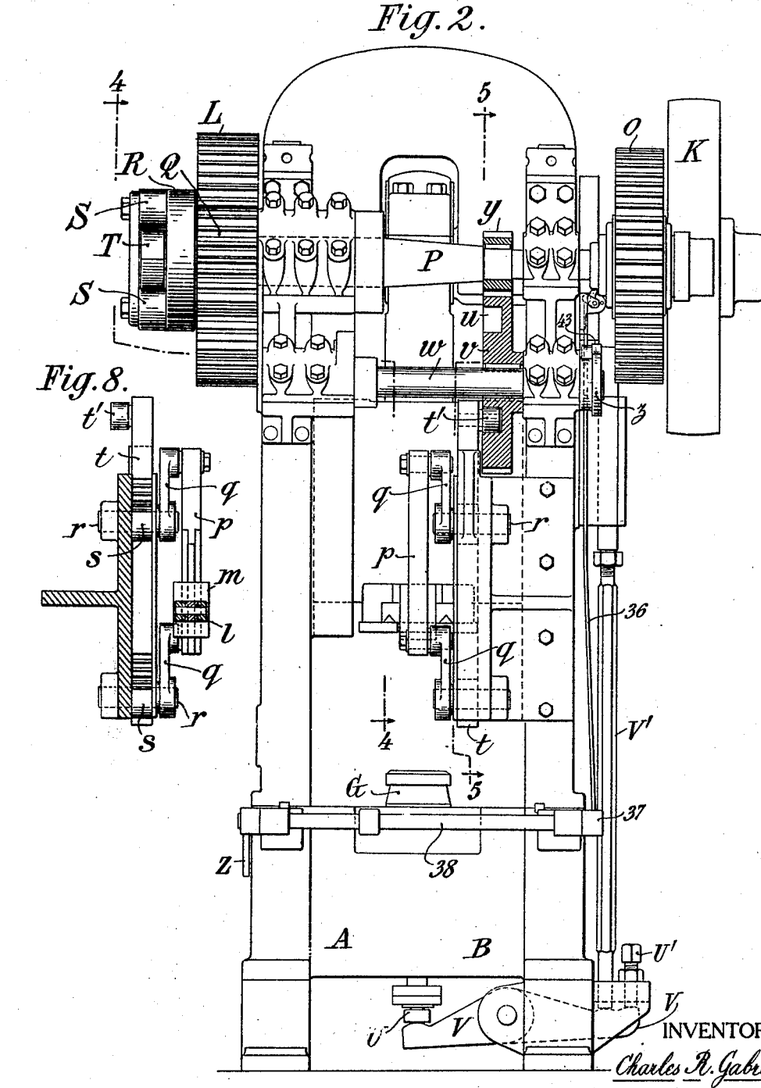
Fig. 2 is a rear elevation, being partly in vertical section on the line 2—2 in Fig. 5.
Fig. 8 is a fragmentary vertical section on the line 8—8 in Fig. 3, viewed from the front.

For lifting out the completed extruded article from the female die the press is provided with the usual knock-out or ejector plunger U (Fig. 7), the lower end of which beneath the bed B is engaged by a lever V which is driven through a rod V' from a cam W (Fig. 1) keyed on the shaft J and acting against a roller $i$ on the slide $j$ driving the rod V' and lifted by a spring $j'$. The ejector U drops by its own weight and the lever is stopped against a screw U'.

Figure 5:
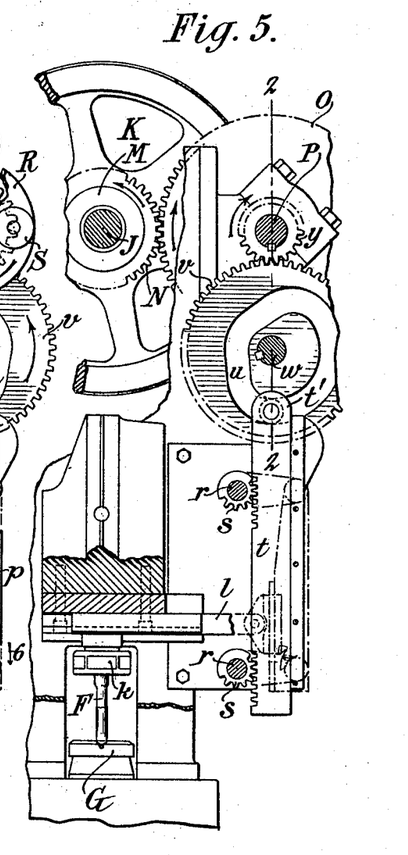
Fig. 5 is a fragmentary vertical mid-section showing a different position from Fig. 4.
Figure 6:
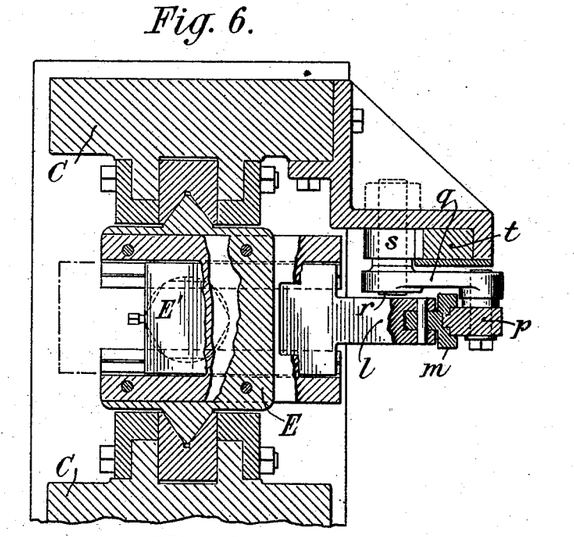
Fig. 6 is a horizontal section on a larger scale, on the line 6—6 in Fig. 3.

My invention also provides means for displacing the punch toward the front of the press to facilitate stripping the product from the punch. For this purpose the punch (which as usual may be fastened in a chuck $h$, Fig. 7) is carried by an auxiliary slide E' movable from front to rear relatively to the sliding head E. The slide E' is reciprocated by means which will now be described. It is prolonged rearwardly at $l$ and terminates in a head $m$ having a sliding engagement with a parallel bar P. This bar at its top and bottom is jointed to crank studs on arms $q$ $q$ which are mounted on rock shafts $r$ $r$ to which are fixed pinions $s$ $s$ gearing with rack teeth on a slide $t$ having vertical movement and carrying at its upper end a roller $t'$ which enters a cam groove $u$ in a gear wheel $v$ which is conveniently mounted on a shaft $w$ and is driven by a pinion $y$ on the shaft P. The pinion $y$ and gear $v$ have a ratio of 3 to 1, so that the latter makes one revolution to each stroke of the press. During the working stroke the slide E' is in its rearward position, the parts being as shown in Figs. 4 and 5. During the up-stroke the slide E' is shifted forward until the stripping position shown in Fig. 3 is reached. This is accomplished by the lifting of the slide $t$ by the cam $u$, whereby the crank arms $q$ are turned through about 90°, lifting and displacing forwardly the parallel bar $p$, and through its engagement with the crosshead $m$ pushing forward the slide E'. The slide dwells in this position for a sufficient time to enable the extruded object to be stripped (either mechanically or manually) from the punch. The action of the cam then causes a return movement of the intermediary parts, and the slide E' moves back to its original working position shown in Figs. 4 and 5.

In any press of this character it is desirable to provide for stopping it at the end of any complete operation. For this purpose any suitable clutch may be provided, such as the well-known Bliss key clutch, which may be introduced at any suitable point in the driving train and controlled in the usual manner from either shaft P or shaft w, or any other parts which make one revolution to one complete operation of the press. The clutch may be conveniently applied at the hub of the gear O, so that this gear when free may turn idly on the shaft P. Such a clutch forms in itself no part of the present invention. The preferred arrangement is that shown in Figs. 16–18. The gear O is driven continuously from the pulley K through pinion N, and turns loosely on the shaft P until clutched thereto by the usual type of Bliss clutch. The example of this clutch shown is essentially the same as that illustrated in the patent to E. W. Bliss Company, No. 1,501,422, dated July 15, 1924, having two oscillating keys 30, 31, turning in grooves in the shaft P (or in collars fixed thereon) and in the driving position engaging notches within the inner hub 32 of the gear O. The key 30 has a disengaging arm 33 which, as it turns toward the stopping position, may be engaged by a stop arm 34 when the latter is in the position shown in Fig. 17, so that as the arm 33 engages it, said arm will be pressed back and will oscillate the key 30 to the free position to stop the press; the key 31 is turned from the key 30, both keys having springs tending to oscillate them into the engaging position. The arm 34 is on a rock-shaft 35 having an arm engaged by a rod 36 located vertically at the side of the press and connected at its lower end to an arm 37 carried on a rock-shaft 38 which is moved by the hand lever (or treadle) Z. So long as lever Z is kept pressed down, the stop arm 34 is held out of the path of the revolving arm 33 and the clutch remains engaged; but upon the release of the lever, a spring 39 pulls up the rod 36 and the latter, through tappets 41, 42, acts on the tail of a lever 40 to bring its opposite arm having a roller 43 to bear against the periphery of a cam z conveniently carried on the shaft w (or any shaft which is timed with the eccentric shaft); at one point in the revolution of this cam the roller 43 drops into a cam notch 44, which permits the stop arm 34 to move into the path of the key arm 33, and the clutch is thereby disengaged. The location of the notch 44 is such that this disengagement occurs at the instant when, at the end of the up-stroke of the slide E, the punch F has been displaced to the position shown in Fig. 3. Or, if the mechanism for thus laterally displacing the punch is not employed, the stoppage will in any event occur when the punch-carrying slide is at the top or substantially the top of its stroke.

Figures 16, 17, 18:
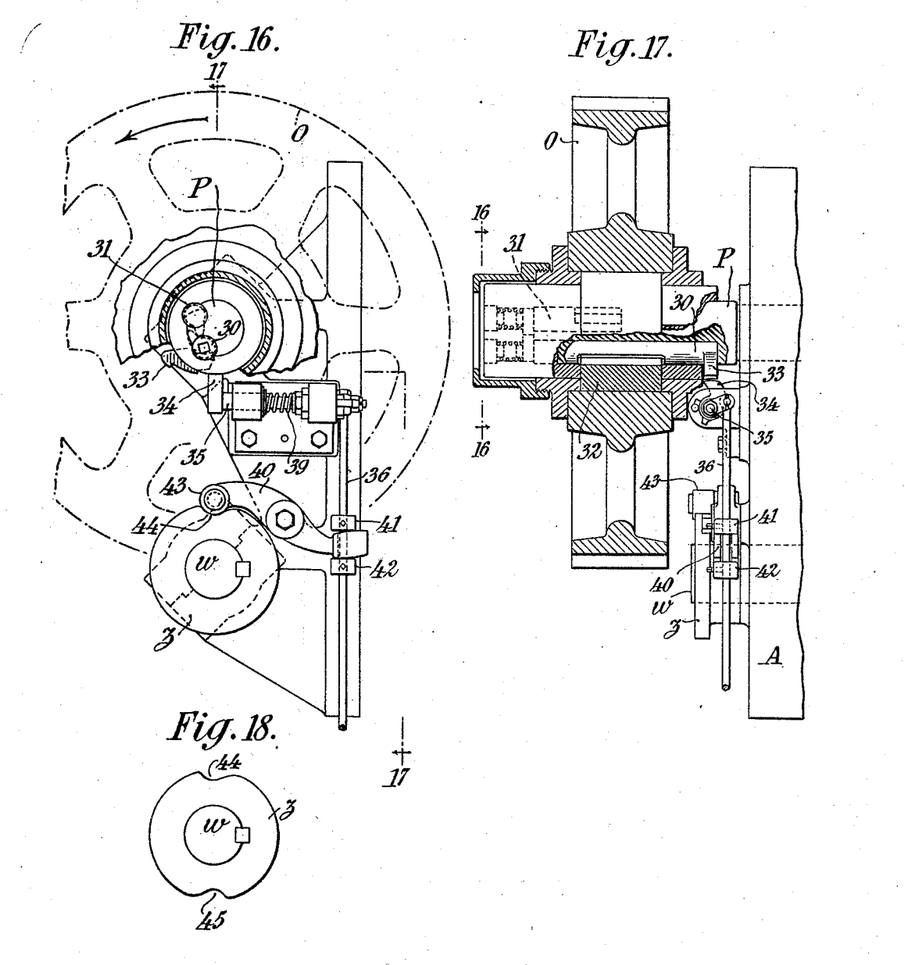
Fig. 16 is a fragmentary elevation showing the clutch mechanism, being partly in section on the line 16—16 in Fig. 17.
Fig. 17 is a vertical section thereof in planes indicated mainly by the line 17—17 in Fig. 16, the parts being viewed from the front, as in Fig. 1.
Fig. 18 is an end elevation of the shaft w of Fig. 16, showing a modified form of the clutch-controlling cam.

In some presses it is desirable to provide for stopping the press at the bottom of the stroke of the reciprocating head E in order to cause a dwell for permitting the work being operated upon to set while under extreme pressure between the respective dies. This may occur when a heated material is being operated upon and it is desired to allow a momentary rest for it to cool while confined between the dies; other conditions may occur where such a dwell is desirable. To provide for such dwell the cam z is made with a notch 45 located diametrically opposite from the notch 44 of Fig. 16; this is shown in Fig. 18. The roller 43 falls into notch 45 coincidently with the punch reaching its extreme bottom position, so as to stop the press at this point. It is in most such cases desirable also to provide for stopping the press at top stroke, and for this purpose the cam notch 44 is also provided, as shown in Fig. 18.

The mechanism just described efficiently provides for the proper stopping of the press automatically at the top of the stroke of the punch slide, or at both top and bottom, as may be desired.

It is desirable to provide for turning the crank-shaft J angularly relatively to the gear L or otherwise to provide for the angular adjustment of the eccentric I, so as to vary the eccentric stroke relatively to the modified movement induced by the co-operation of the parts S T S. For this purpose any known mechanical means for setting the gear L in different angular positions on the shaft may be provided.

Figure 14:
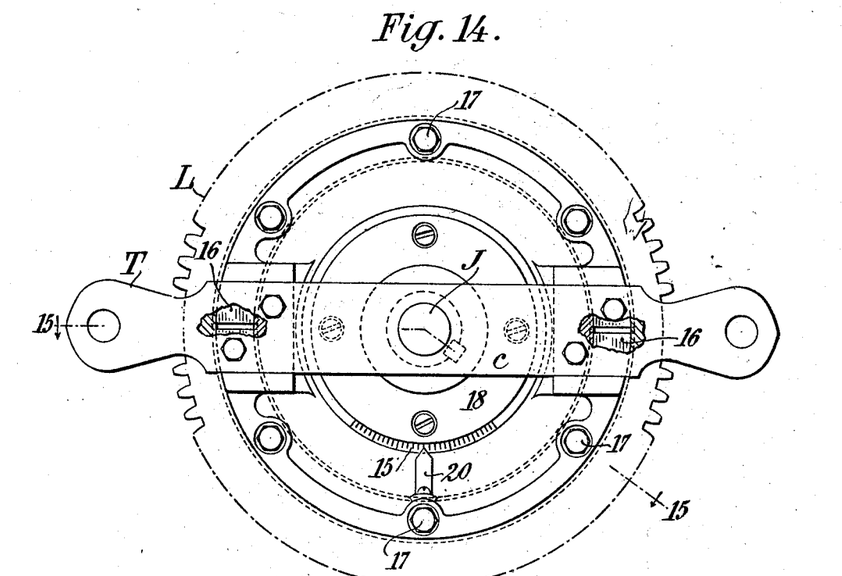
Fig. 14 is an elevation of the gear L in Fig. 3 and its appurtenant parts, showing a feature of construction more in detail.
Figure 15:
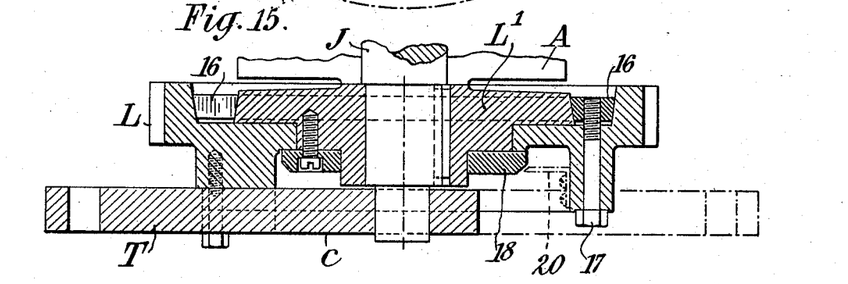
Fig. 15 is an axial radial section on the line 15—15 in Fig. 14.

A suitable means for accomplishing this angular adjustment is shown in Figs. 14 and 15. The other parts are the same as shown in Fig. 3, but illustrated with more detail. The gear L, instead of being formed in one piece and keyed on the main shaft J, is formed in two parts, of which the inner portion $L^1$ is keyed on the shaft, and the outer portion is concentrically mounted on the inner portion and frictionally locked thereto by means of an annular wedge 16 which is drawn by studs 17 between two tapered faces formed on the respective parts of the gear, as clearly shown in Fig. 15. To adjust the angular relation of the cam projection T to the eccentric, it is only necessary to slacken off the studs 17, then turn the parts to the desired new position, and retighten these studs. The ring or annular wedge 16 is desirably divided into two half rings, as shown in the broken away portions in Fig. 14. The outer portion of the gear L may be held in correct relation with the inner part $L^1$ by means of a collar 18, as shown. To facilitate the adjustment it is desirable to mark graduations at 19 on this collar 18 and to provide a pointer 20 fastened on some convenient part of the outer gear, either as shown in full lines in Fig. 14, or in dotted lines in Fig. 15, to point toward these graduations. By this means, and by suitably numbering the graduations in degrees or otherwise, any desired setting of the gear with reference to the eccentric may be readily accomplished. By this means the precise relation between the curve $f\ g\ h$ (Fig. 13) and the normal pendulous curve, due to the crank or eccentric movement, may be varied at will so as to vary the throw imparted by the eccentric to the working head between the points $g$ and $h$. An effective means for accomplishing this result affords an important feature of the machine.

While the improved press herein described is peculiarly adapted for extruding, yet it is to be understood that the invention has other applications and generally may be applied to any press or analogous machine wherein a heavy resistance is encountered toward the end of the working stroke. Thus, for example, in presses for punching heavy plate metal it is desirable to slow down the punch just as it encounters the resistance of the metal plate, and to force it through the latter under increased leverage; for any such purpose the invention is well suited.

It is to be understood that the special cam gearing described, while a suitable and advantageous mechanical movement, is not by any means the only way in which the invention may be carried into effect. In its place any other movement may be provided which is adapted to modify the normal stroke imparted by a crank or eccentric, so as to vary the chart of such stroke from the usual sine curve to a curve having substantially the characteristics of that shown in Fig. 13. In one aspect of the invention a characteristic feature is that the working part, such as the punch, is carried rapidly over its main idle stroke and then brought to rest, or substantially so, before performing its arduous work, and then operated slowly through its effective stroke under increased leverage, to give a squeezing action instead of the usual hammer blow effect on the punch. For extrusion it is desirable that the punch be brought to a stop just before it encounters its extreme load; but for other work such as punching, it may be quite sufficient if it be brought to a much retarded speed without being actually stopped. It will be obvious that the structure may be varied in many ways without departing from the essential features of the invention.

The invention has been described with reference to a vertical press, but is equally applicable to horizontal or inclined presses. Such expressions as vertical, horizontal, etc., are to be understood in a relative sense. It is also to be understood that where an eccentric is referred to in the claims, a crank is to be understood as the well-recognized equivalent of an eccentric; this invention being adapted equally to crank-driven and eccentric-driven punch slides.

What I claim is:

1. A power press comprising a reciprocating head, and mechanical means for operating it, said means adapted to drive the head at relatively high speed during the idle part of its working stroke, and means for imparting the effective part of its stroke at an increased power ratio.

2. A power press comprising a reciprocating head, and mechanical means for operating it, said means including an eccentric movement adapted to drive the head at relatively high speed during the idle part of its working stroke, then to bring it substantially to rest, and means for modifying such movement adapted to bring the head substantially to rest before the end of its normal stroke and to drive it at an increased power ratio during the remaining effective part of such stroke.

3. An extruding press comprising extruding dies, a reciprocating head carrying one of such dies, and mechanical means for operating said head, said means adapted to drive the head at relatively high speed during the idle part of its working stroke, and means for driving it at an increased power ratio during the extruding operation.

4. An extruding press comprising extruding dies, a reciprocating head carrying one of such dies, and mechanical means for operating said head, said means adapted to drive the head at relatively high speed during the idle part of its working stroke and until the resistance of the blank is encountered, then to bring it substantially to rest, and then to drive it at an increased power ratio during the extruding operation.

5. A power press comprising a reciprocating head, an eccentric and connecting means for operating said head, and means coacting therewith for varying the stroke of the head, adapted to reduce its speed during the effective part of its stroke, while encountering the resistance of the work.

6. A power press comprising a reciprocating head, an eccentric and connecting means for operating said head, and means coacting therewith for varying the stroke of the head, adapted to bring it substantially to a stop during its working stroke, and then to drive it at reduced speed during the remaining portion of such stroke.

7. A power press comprising a reciprocating head, an eccentric and connecting means for operating said head, and means coacting therewith for varying the stroke of the head, said means adapted to vary the rotation of the eccentric by retarding it during the latter and effective portion of the stroke.

8. A power press comprising a reciprocating head, an eccentric and connecting means for operating said head, and means coacting therewith for varying the stroke of the head, said means adapted to vary the rotation of the eccentric by bringing it substantially to a stop during the working stroke, and thereafter to drive it at reduced speed for the remaining portion of such stroke.

9. A power press comprising a reciprocating head, a main shaft carrying an eccentric for driving said head, a back-shaft, means for rotating said back-shaft, and variable gearing between said back-shaft and main shaft adapted to rotate the eccentric at varying speeds to drive the head at relatively high speed during the idle part of its working stroke, and at low speed during the effective part of such stroke.

10. A power press comprising a reciprocating head, a main shaft carrying an eccentric for driving said head, a back-shaft, means for rotating said back-shaft, and variable gearing between said back-shaft and main shaft adapted to rotate the eccentric at varying speeds to drive the head at relatively high speed during the idle part of its working stroke, then to bring it substantially to rest, and then to drive it at low speed during the remaining effective part of such stroke.

11. A press comprising a reciprocating head and means for reciprocating it, with dies one of which is reciprocated by said head, and an intervening slide carried by the head by which said last-named die is held, movable in horizontal direction, and means independent of said head for moving the slide forward upon the upstroke to carry said die into convenient position for delivering the work therefrom.

12. A press comprising a reciprocating head and means for reciprocating it, with dies one of which is reciprocated by said head, a horizontal slideway carried by the head, slide by which said last-named die is held, movable on said head in said slideway, and means independent of the head for moving the slide forward upon the upstroke to carry said die into convenient position for delivering the work therefrom and for moving it back to bring the dies into alignment before their effective engagement begins.

13. A press comprising a reciprocating head and means for reciprocating it, with dies one of which is reciprocated by said head, and an intervening slide by which said last-named die is held, movable on said head in horizontal direction, and means for moving it forward upon the upstroke to carry said die into convenient position for delivering the work therefrom, said last-named means comprising a movable part having upright sliding engagement with the slide, and means for moving it bodily forward and back in timed relation with the reciprocation of the head.

14. A press comprising a reciprocating head and means for reciprocating it, with dies one of which is reciprocated by said head, and an intervening slide by which said last-named die is held, movable on said head in horizontal direction, and means for moving it forward upon the upstroke to carry said die into convenient position for delivering the work therefrom, said last-named means comprising a parallel bar having upright sliding engagement with the slide, arms for moving said bar, a slide driving said arms, and a cam reciprocating said last-named slide.

15. A power press comprising a reciprocating head, an eccentric, and connecting means for operating said head, and means coacting therewith for varying the stroke of the head, said means adapted to vary the rotation of the eccentric by retarding it during the latter and effective portion of the stroke, and means for adjusting the relation of the last-named means and the eccentric whereby to vary the portion of the stroke at which such retardation occurs.

16. A power press comprising a reciprocating head, a main shaft carrying an eccentric for driving said head, a back-shaft, means for rotating said back-shaft, and variable gearing between said back-shaft and main shaft adapted to rotate the eccentric at varying speeds to drive the head at relatively high speed during the idle part of its working stroke, and at low speed during the effective part of such stroke, said variable gearing comprising a gear mounted on the main shaft, and means for varying the angular relation of said gear to the eccentric, whereby to vary the portion of the stroke at which such retardation to low speed occurs.

17. A power press comprising a reciprocating head, mechanical means for driving said head at relatively high speed during the idle part of its stroke and for imparting the effective part of its stroke more slowly under increased power ratio, said means including a main shaft directly driving said head and means for rotating said shaft, with a clutch adapted to engage or disengage the rotating means, and means for disengaging said clutch at an end of the stroke of said head, including a cam timed with said shaft for determining the period of such disengagement.

18. A power press according to claim 17, the cam being adapted for disengaging the clutch when the head is at the upper part of its stroke and when the head at the bottom of its stroke has completed its effective stroke under increased power ratio.

In witness whereof, I have hereunto signed my name.

CHARLES R. GABRIEL.